(12) United States Patent
Durrant

(10) Patent No.: US 7,171,566 B2
(45) Date of Patent: Jan. 30, 2007

(54) DATA ENCRYPTION AND DECRYPTION

(75) Inventor: Paul Durrant, Slough (GB)

(73) Assignee: Sun Microsystems, Inc., Santa Clara, CA (US)

( * ) Notice: Subject to any disclaimer, the term of this patent is extended or adjusted under 35 U.S.C. 154(b) by 922 days.

(21) Appl. No.: 10/193,568

(22) Filed: Jul. 11, 2002

(65) Prior Publication Data

US 2003/0061499 A1 Mar. 27, 2003

(30) Foreign Application Priority Data

Sep. 21, 2001 (GB) ................................. 0122850.1

(51) Int. Cl.
*H04K 1/00* (2006.01)
*H04L 9/00* (2006.01)
(52) U.S. Cl. ...................... 713/189; 380/255
(58) Field of Classification Search ...................... None
See application file for complete search history.

(56) References Cited

U.S. PATENT DOCUMENTS

| 5,600,726 A | 2/1997 | Morgan et al. ................ 380/49 |
| 5,959,276 A | 9/1999 | Lijima ......................... 235/380 |
| 6,937,727 B2* | 8/2005 | Yup et al. ..................... 380/37 |
| 2004/0131186 A1* | 7/2004 | Kasuya et al ................ 380/255 |

FOREIGN PATENT DOCUMENTS

| EP | 0 681 233 A1 | 11/1995 |
| EP | 0 862 124 A2 | 9/1998 |
| GB | 2203271 A | 10/1988 |
| GB | 2349250 A | 10/2000 |
| JP | 11243388 A | 9/1999 |
| WO | WO 00/64117 | 10/2000 |

* cited by examiner

*Primary Examiner*—Christopher Revak
(74) *Attorney, Agent, or Firm*—Park, Vaughan & Fleming, LLP

(57) ABSTRACT

In a computer processing apparatus, when writing data to, and/or reading data from, memory, one or more instruction bits are associated with the memory address for the data to specify how encryption or decryption is to be performed. The bit(s) may be part of the memory address or separate therefrom, for example as a data header. Multiple data paths provided to write data to, and read data from, memory. On at least one of the paths is hardware operable to perform encryption or decryption. Preferably at least one path is a non-encryption/decryption path. The path to be used to write the data to, or read the data from, memory is chosen in accordance with the instruction bits associated with the memory address.

54 Claims, 12 Drawing Sheets

| VIRTUAL ADDRESS | PHYSICAL ADDRESS |
|---|---|
| VA(1)<br>.<br>.<br>.<br>VA(n) | 00 PA(1)<br>.<br>.<br>.<br>00 PA(n) |
| VA(n+1)<br>.<br>.<br>.<br>VA(2n) | 01 PA(1)<br>.<br>.<br>.<br>01 PA(n) |
| VA(2n+1)<br>.<br>.<br>.<br>VA(3n) | 10 PA(1)<br>.<br>.<br>.<br>10 PA(n) |
| VA(3n+1)<br>.<br>.<br>.<br>VA(4n) | 11 PA(1)<br>.<br>.<br>.<br>11 PA(n) |

FIG. 3

| VIRTUAL ADDRESS | PHYSICAL ADDRESS | ENCRYPTION BITS |
|---|---|---|
| VA(1) | PA(1) | 00 |
| . | . | . |
| . | . | . |
| VA(n) | PA(n) | 00 |
| VA(n+1) | PA(1) | 01 |
| . | . | . |
| . | . | . |
| VA(2n) | PA(n) | 01 |
| VA(2n+1) | PA(1) | 10 |
| . | . | . |
| . | . | . |
| VA(3n) | PA(n) | 10 |
| VA(3n+1) | PA(1) | 11 |
| . | . | . |
| . | . | . |
| VA(4n) | PA(n) | 11 |

FIG. 9

| VIRTUAL ADDRESS | PHYSICAL ADDRESS |
|---|---|
| 00 VA(1) <br> . <br> . <br> . <br> 00 VA(n) | PA(1) <br> . <br> . <br> . <br> PA(n) |
| 01 VA(1) <br> . <br> . <br> . <br> 01 VA(n) | PA(1) <br> . <br> . <br> . <br> PA(n) |
| 10 VA(1) <br> . <br> . <br> . <br> 10 VA(n) | PA(1) <br> . <br> . <br> . <br> PA(n) |
| 11 VA(1) <br> . <br> . <br> . <br> 11 VA(n) | PA(1) <br> . <br> . <br> . <br> PA(n) |

FIG. 11

DATA ENCRYPTION AND DECRYPTION

RELATED APPLICATION

This application hereby claims priority under 35 U.S.C § 119 to Patent application No. 0122850, filed Sep. 21, 2001 in the United Kingdom, entitled "Data Encryption and Decryption," by inventor Paul Durrant.

FIELD OF THE INVENTION

The present invention relates to the field of data encryption and decryption within a computer.

BACKGROUND OF THE INVENTION

The encryption and decryption of computer data is widely known and used. For example, data is often encrypted for information protection before it is stored or transmitted across a network, and is then subsequently decrypted for use.

Known techniques for performing encryption and decryption fall into two categories, namely those using software and those using dedicated hardware.

Software techniques, in which data is encrypted/decrypted in accordance with stored computer software instructions, are widely used since they provide the advantage that the software instructions can be executed to encrypt/decrypt data of different types and from different data paths within the computer. The problem with such software techniques, however, is that, the encryption/decryption is time consuming and/or requires considerable processing resources.

Dedicated hardware for performing encryption/decryption is used in computer input/output devices, such as network cards etc. This enables data encryption/decryption to be performed quickly, but suffers from the problem that dedicated hardware must be provided for each data path on which data is to be encrypted/decrypted. This considerably reduces the practicality of using dedicated hardware and makes it inflexible for encryption/decryption.

SUMMARY OF THE INVENTION

According to the present invention, there is provided a computer processing apparatus or method in which, when writing data to, and/or reading data from, memory, one or more instruction bits are associated with the memory address for the data to specify how encryption or decryption is to be performed. The bit(s) may be part of the memory address or separate therefrom (for example as a data header). Multiple data paths are provided to write data to, and read data from, memory. On at least one of the paths is hardware operable to perform encryption or decryption. Preferably at least one path is a non-encryption/decryption path. The path to be used to write the data to, or read the data from, memory is chosen in accordance with the instruction bits associated with the memory address.

The present invention therefore provides a data encrypter and/or decrypter arranged to encrypt and/or decrypt data in dependence upon encryption instructions associated with a memory address. This may be part of a computer's memory interface controller, a computer's CPU, a memory management unit for an input/output device, etc.

The present invention also provides a facility to set encryption bits associated with a memory address to indicate the encryption and/or decryption of data. This may be in the form of software, for example part of an application, part of an operating system, or part of a device driver, for controlling a processor to set the bits.

BRIEF DESCRIPTION OF THE DRAWINGS

Embodiments of the invention will now be described, by way of example only, with reference to the accompanying drawings, in which like reference numbers are used to designate like parts, and in which:

FIG. 3 shows an example of a translation table generated and maintained in a first embodiment by the operating system of the computer in FIG. 1 to convert virtual memory addresses to physical memory addresses;

FIG. 9 shows an example of a translation table generated and maintained in the second embodiment by the operating system of the computer in FIG. 1 to convert virtual memory addresses to physical memory addresses;

FIG. 11 shows an example of a translation table generated and maintained in a third embodiment by the operating system of the computer in FIG. 1.

DETAILED DESCRIPTION OF EMBODIMENTS

First Embodiment

A first embodiment of the invention will now be described. As will be explained below, in the first embodiment, data encryption/decryption is performed by hardware in a computer's memory interface controller in accordance with instructions from the computer's central processing unit (CPU) or from a memory management unit (MMU) for an input/output (I/O) device, the instructions being incorporated in a physical memory address defining the address to, or from, which data is to be written/read.

Figure 1:
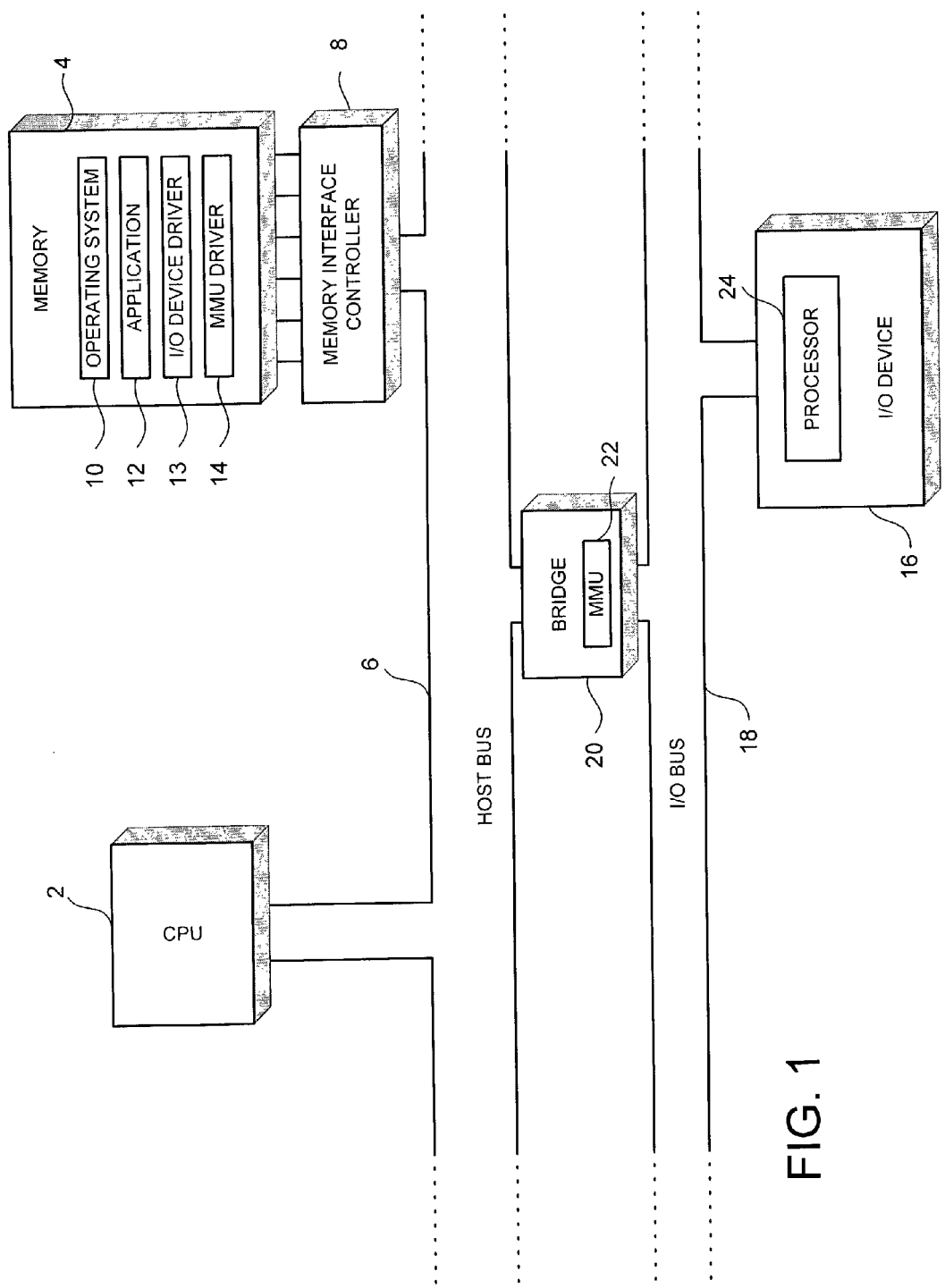
FIG. 1 shows the functional components in a computer and an input/output device for writing data to, and reading data from, memory in embodiments of the invention.

Referring to FIG. 1, within a computer, a CPU 2 is connected to memory 4 via a host bus 6 and a memory interface controller 8. Data can be written to, and read from, memory 4 by CPU 2.

The memory 4 is schematically shown as a single unit at one location in FIG. 1. However, the memory 4 comprises the computer's RAM, and could therefore, in practice, be distributed at different physical locations.

The memory 4 stores, inter alia, software 10 defining the computer's operating system, and software 12 defining an application to be run on the computer. This software may be input to the computer as instructions on a data storage device, such as a CD-ROM etc.

An input/output (I/O) device 16 such as a network card, disk drive, CD reader/writer, printer, scanner, etc., is also connected to the memory 4 via an I/O bus 18 and bridge 20 within the computer, and the host bus 6 and memory interface controller 8.

The bridge 20 connects the host bus 6 and I/O bus 18 and controls the transfer of data therebetween in a conventional manner. In this embodiment, the bridge 20 includes a memory management unit (MMU) 22, which controls access to the memory 4 by the I/O device 16, as will be described below.

The I/O device 16 has a processor 24 to control the exchange of data with the computer, and is operable to write data to, and read data from, memory 4 independently of the computer CPU 2.

Software 13 defining a driver for the I/O device 16 and software 14 defining a driver for the MMU 22 is stored in the computer memory 4. This software may be input to the computer as instructions on a data storage device, such as a CD-ROM etc.

It will be appreciated that, although the CPU 2, memory interface controller 8 and bridge 20 are shown as separate components in FIG. 1, the CPU 2 and either or both the memory interface controller 8 and bridge 20 may be provided in practice as a single integrated circuit.

In use, in order to write data to, or read data from, memory 4, a write/read request from an application 12 being run on the computer is sent to the CPU 2, together with a virtual address defining the memory location to/from which data is to be written/read. The CPU 2 then converts the virtual address into a physical address in accordance with a translation table maintained by the operating system 10, and sends the write/read request to the memory interface controller 8 together with the physical address defining the physical memory to/from which data is to be written/read.

Similarly, in the case of memory access by the I/O device 16, a write/read request together with a virtual memory address is sent from the processor 24 in the I/O device 16 to the MMU 22 within the bridge 20. The MMU 22 then converts the virtual address into a physical address in accordance with a translation table maintained by the MMU driver 14, and sends the write/read request to the memory interface controller 8, together with the physical address defining the physical memory to/from which data is to be written/read.

In this embodiment, the microprocessors comprising the computer CPU 2 and included in the bridge 20 use a 64-bit word to specify each physical memory address. Accordingly, this provides capacity for specifying approximately $1.8 \times 10^{19}$ bytes of physical memory, which is greater than the physical memory actually available in the memory 4.

As will now be explained, in this embodiment, use is made of this overcapacity in memory addressing by controlling the CPU 2 and MMU 22 to use some of the bits available for defining a physical memory address to define whether data to be written to, or read from, memory 4 is to be encrypted/decrypted. Hardware logic is provided in the memory interface controller 8 to encrypt/decrypt data or pass data unchanged in accordance with the encryption/decryption bits in the physical memory address provided by the CPU 2 or MMU 22.

Figure 2:
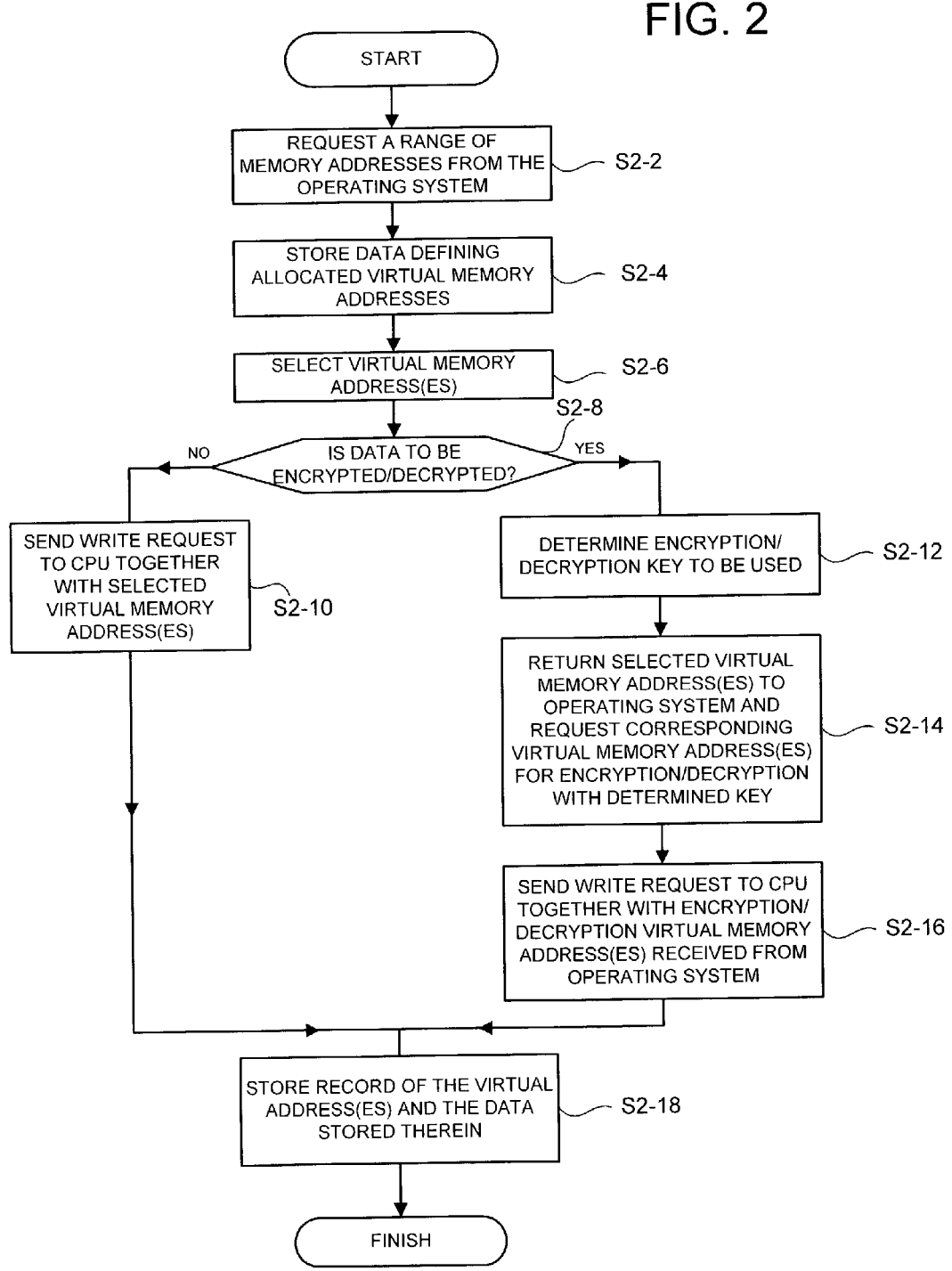
FIG. 2 is a flow chart of the processing operations carried out by the computer in FIG. 1 in response to instructions from an application being run on the computer to generate a request to write data to memory.

FIG. 2 shows the processing operations carried out by an application 12 to generate a request to write data to memory 4 in this embodiment.

Referring to FIG. 2, the application 12 sends a request to the operating system 10 for the allocation of a range of memory addresses (operation S2–2). (Of course, this operation and also operation S2–4 are omitted if the application 12 has previously been allocated the necessary memory addresses by the operating system 10.)

In response to the request, the operating system 10 allocates a range of virtual memory addresses, and returns the addresses to the application 12. In addition, the operating system 10 sets up a translation table which maps the virtual addresses allocated to the application to physical memory addresses, and stores the translation table in memory 4 or within cache memory in the CPU 2.

FIG. 3 shows an example of a translation table 30 for virtual memory address to physical memory address conversion generated by the operating system 10 in this embodiment in response to a memory allocation request from an application 12.

Referring to FIG. 3, in this example, virtual addresses VA(1) to VA(n) are the addresses allocated and returned to the application 12 by the operating system 10. However, the operating system 10 generates the translation table 30 and stores data therein to translate 4n virtual memory addresses, VA(1) to VA(4n), to physical memory addresses. Although each physical memory address is unique, the first two bits of each physical memory address are used as "encryption bits" to define encryption/decryption instructions for the data to be written to, or read from, the memory address, and the remaining bits are used to specify just "n" physical memory addresses. Thus, the "n" physical memory addresses are mapped into four different virtual address ranges (that is VA(1) to VA(n), VA(n+1) to VA(2n), VA(2n+1) to VA(3n) and VA(3n+1) to VA(4n)).

More particularly, in this embodiment, for one range of virtual memory addresses the first two bits of each 64-bit physical memory address are defined to be 00 to specify that no data encryption/decryption is to be performed, for one range of virtual memory addresses the first two bits of each physical memory address are defined to be 01 to specify that data encryption/decryption is to be performed using a first predetermined encryption/decryption key, for one range of virtual memory addresses the first two bits of each physical memory address are defined to be 10 to specify that data encryption/decryption is to be performed using a second predetermined encryption/decryption key, and for one range of virtual memory address the first two bits of each physical memory address are defined to be 11 to specify that data encryption/decryption is to be performed using a third predetermined encryption/decryption key. The remaining 62 bits of each physical memory address define 1 of "n" addresses of the physical memory to which data is to be written or from which data is to be read.

Thus, referring to FIG. 3, the entries 32 in the translation table 30 map the virtual addresses VA(1) to VA(n) to the physical addresses PA(1) to PA(n) with the values 00 at the start. The entries 34 map the virtual addresses VA(n+1) to VA(2n) to the physical addresses PA(1) to PA(n) with the values 01 at the start. The entries 36 map the virtual addresses VA(2n+1) to VA(3n) to the physical addresses PA(1) to PA(n) with the values 10 at the start. Similarly, the entries 38 map the virtual addresses VA(3n+1) to VA(4n) to the physical addresses PA(1) to PA(n) with the values 11 at the start.

It should be noted that, in the notation used above, the "n" physical memory addresses are consecutive, that is PA(1) to PA(n). However, in practice, the physical memory addresses need not be consecutive.

It should also be noted that, for simplicity, the two bits defining encryption/decryption instructions are provided at the start of each physical memory address in this embodiment. However, the encryption/decryption bits may be provided at other predetermined locations in the physical memory address.

Referring again to FIG. 2, the application 12 stores data defining the virtual memory addresses allocated by the operating system 10 (operation S2–4). As described above, in this embodiment, these addresses comprise the virtual addresses VA(1) to VA(n), and not the full range of virtual addresses VA(1) to VA(4n) stored in the translation table 30.

The application 12 selects one or more of the virtual memory addresses allocated by the operating system 10 as the address(es) to which data is to be written (operation S2–6).

The application 12 determines whether the data to be written to memory 4 is to be encrypted/decrypted (operation S2–8).

If it is determined that the data is not to be encrypted/decrypted, then the application 12 sends a write request (operation S2–10) to the CPU 2 together with the virtual memory address(es) selected in operation S2–6. In this way, one or more virtual memory addresses in the range VA(1) to VA(n) are sent to the CPU 2. In the translation table 30, virtual addresses in this range are mapped to physical memory addresses having the values 00 at the start. As explained above, the values 00 at the start of a physical memory address define that data is not to be encrypted/decrypted.

On the other hand, if it is determined in operation S2–8 that the data to be written to memory 4 is to be encrypted/decrypted, then the application 12 determines (operation S2–12) the encryption/decryption key to be used (this being defined in the application code by the application programmer).

The application 12 then returns (operation S2–14) the virtual memory address(es) selected in operation S2–6 to the operating system 10 and requests corresponding virtual memory address(es) for encryption/decryption with the key determined in operation S2–12.

In response, the operating system 10 refers to the translation table 30 and returns the requested address(es) to the application 12. More particularly, by way of example, if the application 12 returns the virtual address VA(3) to the operating system and requests a corresponding virtual memory address for encryption/decryption with key 2, then the operating system 10 returns the virtual address VA(2n+3) to the application. Similarly, if the application returns the virtual address VA(n) to the operating system and requests the corresponding virtual memory address for encryption/decryption with key 3, then the operating system returns to the virtual address VA(4n).

The application 12 sends (operation S2–16) a write request to the CPU 2 together with the virtual memory address(es) received from the operating system in operation S2–14. Thus, the virtual memory address(es) sent to the CPU 2 by the application 12 map to physical memory address(es) in the translation table 30 defining that data is to be encrypted/decrypted with the key determined in operation S2–12.

Following operation S2–16, or operation S2–10 if it was determined in operation S2–8 that no data encryption/decryption is to be performed, the application 12 stores a record of the virtual address(es) sent to the CPU 2 and the data stored therein, in a conventional manner (operation S2–18).

When data is to be read from the memory 4 by the application 12, the application 12 sends a read request to the CPU 2 together with the virtual memory address(es) stored in operation S2–18.

In this way, if the write request to the CPU 2 specified a non-encryption/decryption virtual address, then the read request also specifies a non-encryption/decryption virtual address. Similarly, if the write request specified an encryption/decryption virtual address, then the read request also specifies an encryption/decryption virtual address.

Memory access requests by the I/O device 16 will now be described.

Figure 4:
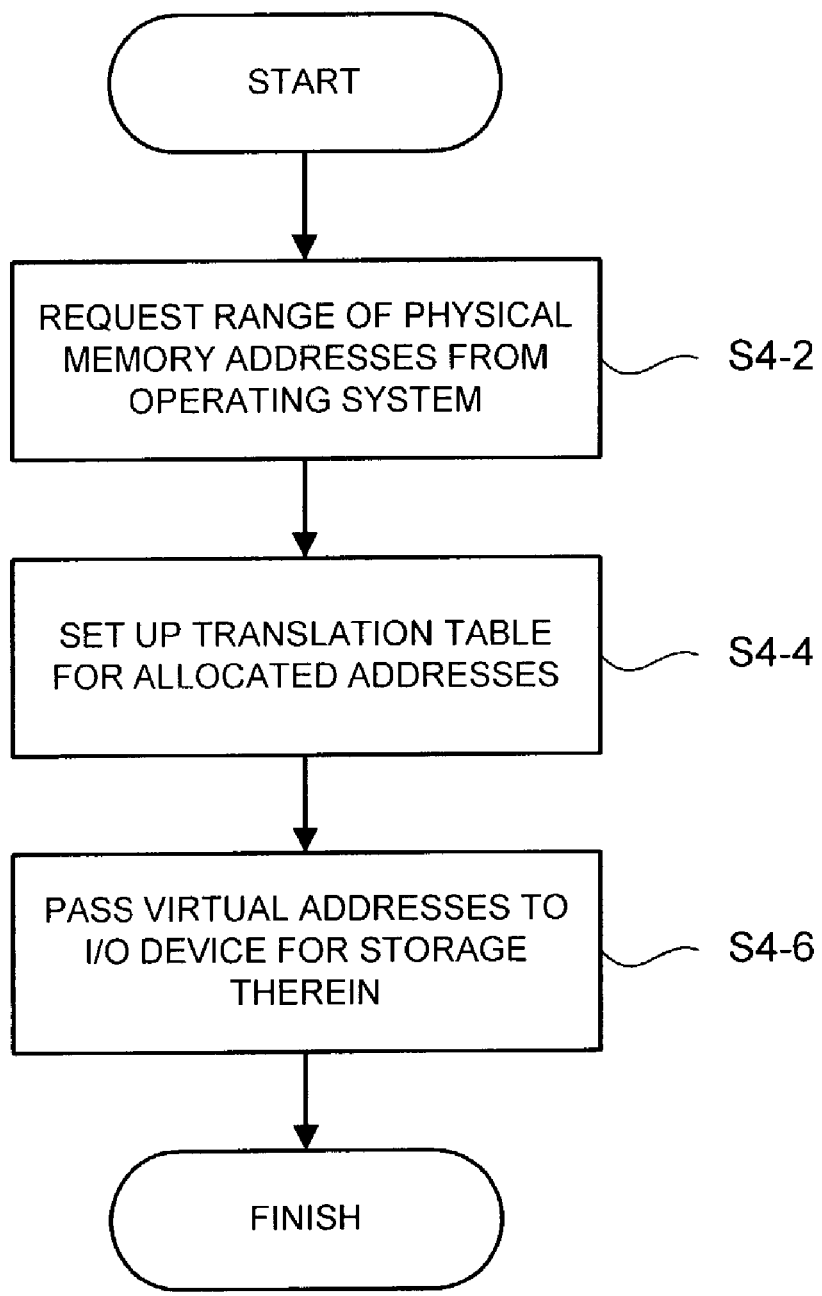
FIG. 4 is a flow chart of the processing operations carried out by the computer in FIG. 1 in response to instructions from an input/output device memory management unit driver when they are executed on the computer to obtain memory allocation for the input/output device.

FIG. 4 shows the processing operations performed by the MMU driver 14 when the instructions therein are executed by the computer to obtain memory allocation for use by the I/O device 16.

Referring to FIG. 4, the MMU driver 14 requests a range of physical memory addresses from the operating system 10 (operation S4–2).

The MMU driver 14 then generates a translation table which maps the physical memory addresses allocated by the operating system 10 to virtual memory addresses for use by the I/O device 16 (operation S4–4).

The format of the translation table generated by the MMU driver 14 depends upon the processing capability of the I/O device 16. More particularly, if the I/O device 16 is operable to select whether data written to, or read from, memory 4 is to be encrypted/decrypted, then the MMU driver 14 generates a translation table 30 as described above with reference to FIG. 3. That is, the MMU driver 14 generates a translation table in which the physical memory addresses allocated by the operating system 10 are mapped into four virtual address ranges, each virtual address range defining the physical memory addresses allocated by the operating system with different values for the two bits at the start of the physical memory address. On the other hand, if data to/from the I/O device 16 is to be only non-encrypted data, then the MMU driver 14 generates a translation table which maps the physical memory addresses allocated by the operating system 10 to one range of virtual memory addresses, with the physical memory addresses being defined in the translation table to have the values 00 at the start. Thus, in this case, the translation table corresponds to the entries 32 in the translation table 30 shown in FIG. 3. Similarly, if data to/from the I/O device 16 is to be encrypted/decrypted with the first predefined encryption key, then the translation table defined by the MMU driver 14 maps the physical memory addresses allocated by the operating system 10 to a single range of virtual memory addresses, with the physical memory addresses being defined in the translation table to have the values 01 at the start (corresponding to entries 34 in the translation table 30 of FIG. 3). If data to/from the I/O device 16 is to be encrypted/decrypted with the second predetermined encryption key then the translation table generated by the MMU driver 14 maps the physical memory addresses allocated by the operating system 10 to a single range of virtual memory addresses, with the physical memory addresses being defined in the translation table to have the values 10 at the start (corresponding to entries 36 in the translation table 30 of FIG. 3). Likewise, if data to/from the I/O device 16 is to be encrypted/decrypted with the third predetermined encryption key, then the translation table generated by the MMU driver 14 maps the physical memory addresses allocated by the operating system 10 to a single range of virtual memory addresses, with the physical memory addresses being defined in the translation table to have the values 11 at the start (corresponding to entries 38 in the translation table 30 of FIG. 3).

Referring again to FIG. 4, the MMU driver 14 sends the virtual addresses defined in the translation table generated in operation S4–4 to the I/O device 16 for storage therein (operation S4–6).

The processing operations performed by the CPU 2 and MMU 22 in response to a memory access request (that is, a write or read request) from the application 12 and the I/O device 16, respectively, will now be described.

Figure 5:
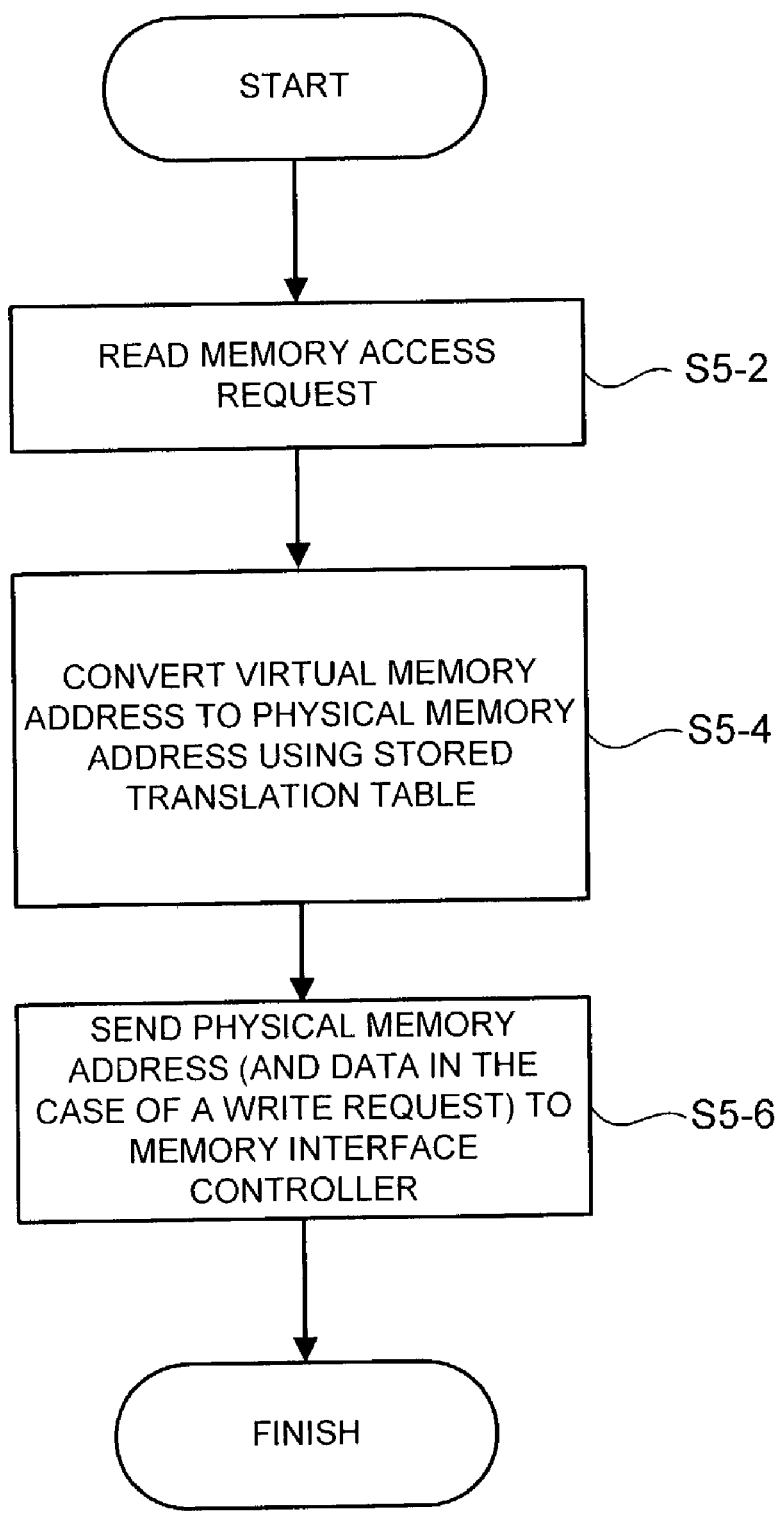
FIG. 5 is a flow chart showing the processing operations performed in a first embodiment by the computer CPU and the memory management unit for the input/output device in FIG. 1 in response to a memory access request.

FIG. 5 shows the processing operations performed by each of the computer CPU 2 (in accordance with operating instructions defined in computer operating system 10) and the MMU 22 (in accordance with operating instructions defined in the MMU driver 14) in response to a memory access request.

The processing operations shown in FIG. 5 will be described below with reference to the CPU 2. However, as noted above, corresponding operations are performed by the MMU 22 to transfer data between the I/O device 16 and memory 4.

Referring to FIG. 5, the CPU 2 reads the memory access request from the application 12, which defines a virtual memory address to/from which data is to be written/read (operation S5–2).

The CPU 2 then converts the virtual memory address defined in the memory access request read in operation S5–2 to a 64-bit physical memory address using the translation table 30 described above, which is maintained by the operating system 10 (operation S5–4).

The CPU 2 sends the physical memory address read in operation S5–4 (including the two encryption/decryption bits at the start) to the memory interface controller 8 (operation S5–6). In the case of a write request, the CPU 2 also sends the data to be written to the memory 4.

As will now be described, the memory interface controller 8 in this embodiment includes hardware logic elements to encrypt/decrypt data read to/from memory 4 in accordance with the two encryption bits set in the physical memory address received from either the CPU 2 of the MMU 22.

Figure 6:
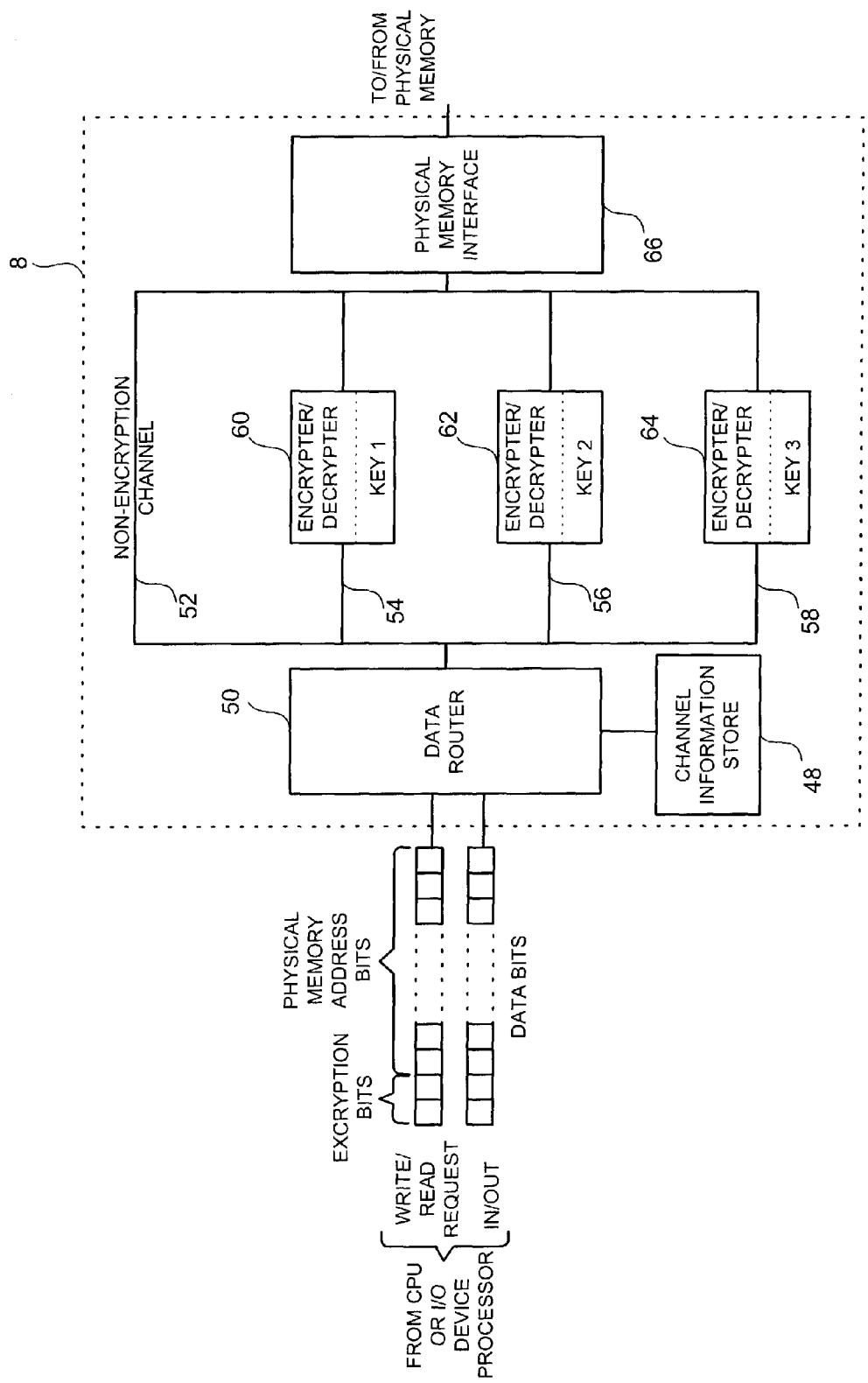
FIG. 6 shows the functional components of the memory interface controller of FIG. 1 in the first embodiment.

Referring to FIG. 6, the memory interface controller 8 contains a conventional physical memory interface 66. In addition, in this embodiment, the memory interface controller 8 contains hardware elements defining four data channels 52, 54, 56, 58 to pass data along when it is written to, or read from, memory 4.

Channel 52 is a "clear" channel and data travelling along this channel is not encrypted/decrypted. On each of channels 54, 56 and 58, hardware logic defining a respective data encrypter/decrypter 60, 62, 64 is provided. Data encrypter/decrypter 60 performs encryption/decryption in accordance with the first predetermined encryption/decryption key, data encrypter/decrypter 62 performs encryption/decryption in accordance with the second predetermined key, and data encrypter/decrypter 64 performs encryption/decryption in accordance with the third predetermined key. The first, second and third encryption keys are defined by data stored in each of the encrypter/decrypters 60, 62 and 64, respectively. This stored data may be changed to define different encryption/decryption keys.

A data router 50 is provided, which determines, in accordance with the values of the two encryption bits set in the 64-bit physical memory address and data stored in a channel information store 48, which of the channels 52, 54, 56, 58 is to be used to write data to, or read data from, memory 4.

Figure 7:
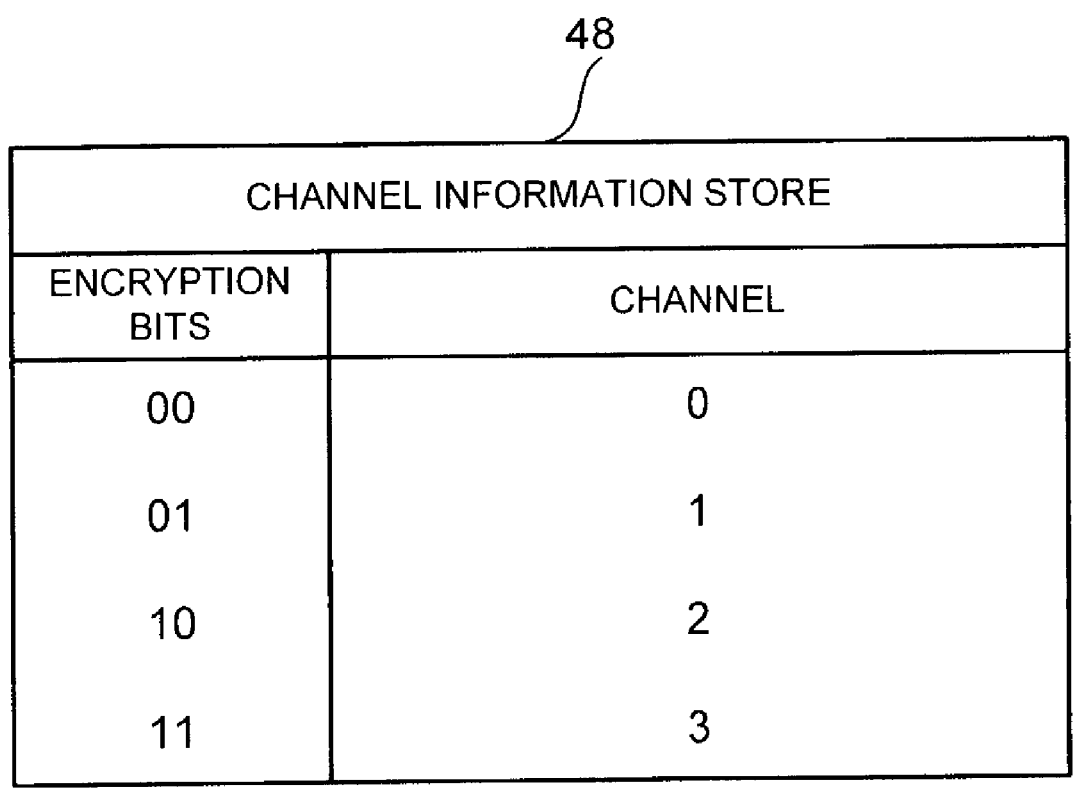
FIG. 7 shows an example of a table of data stored in the channel information store in FIG. 6.

More particularly, as shown in FIG. 7, data is stored in the channel information store 48 defining a mapping between the values of the encryption bits in a physical memory address received by the data router 50 and the data channel along which data is to be written/read. Channels 0, 1, 2 and 3 defined in the stored data correspond respectively to channels 52, 54, 56 and 58 shown in FIG. 6.

When a write/read request is received by the data router 50, the data router reads the values of the first two bits of the physical memory address and selects the channel along which data is to be written to, or read from, memory 4 in dependence upon the data channel defined in the information stored in the channel information store 48.

Accordingly, in this embodiment, if the two encryption bits are set to 00, then data router 50 writes data to, or reads data from, memory 4 via channel 52. In this way, no encryption/decryption of the data occurs. If the value of the encryption bits is 01, data router 50 writes data to, or reads data from, memory 4 using channel 54, with the result that the data is encrypted/decrypted by encrypter/decrypter 60 in accordance with the first encryption key. If the encryption bits are set to 10, data router 50 uses channel 56 to write data to, or read data from, memory 4 so that the data is encrypted/decrypted by encrypter/decrypter 62 using the second encryption key. Similarly, if the encryption bits are set to 11, then data router 50 uses channel 58 to write data to, or read data from, memory 4 so that the data is encrypted/decrypted by encrypter/decrypter 64 using the third encryption key.

In summary by using bits from the physical memory address to control encryption/decryption in the way described above, the computer memory 4 is, in effect, mapped into multiple address ranges, at least one address range providing clear (non-encryption/decryption) memory access and at least one other address range providing encryption/decryption access.

Accordingly, by controlling the computer CPU 2, and/or MMU 22 to send a physical memory address in which encryption bits are set, and by providing encryption/decryption logic in the memory interface controller 8, as described above, it is possible to encrypt and decrypt data using hardware as the data is written to, or read from, memory 4. Consequently, data from any data path can be encrypted/decrypted quickly and efficiently.

Second Embodiment

A second embodiment of the invention will now be described.

In the first embodiment described above, the processing elements 48–64 for routing data to and from memory 4 and for performing data encryption/decryption are provided in the memory interface controller 8.

In the second embodiment, these elements are provided as part of the computer CPU 2 and also as part of the MMU 22. The memory interface controller 8 is of conventional format.

Figure 8:
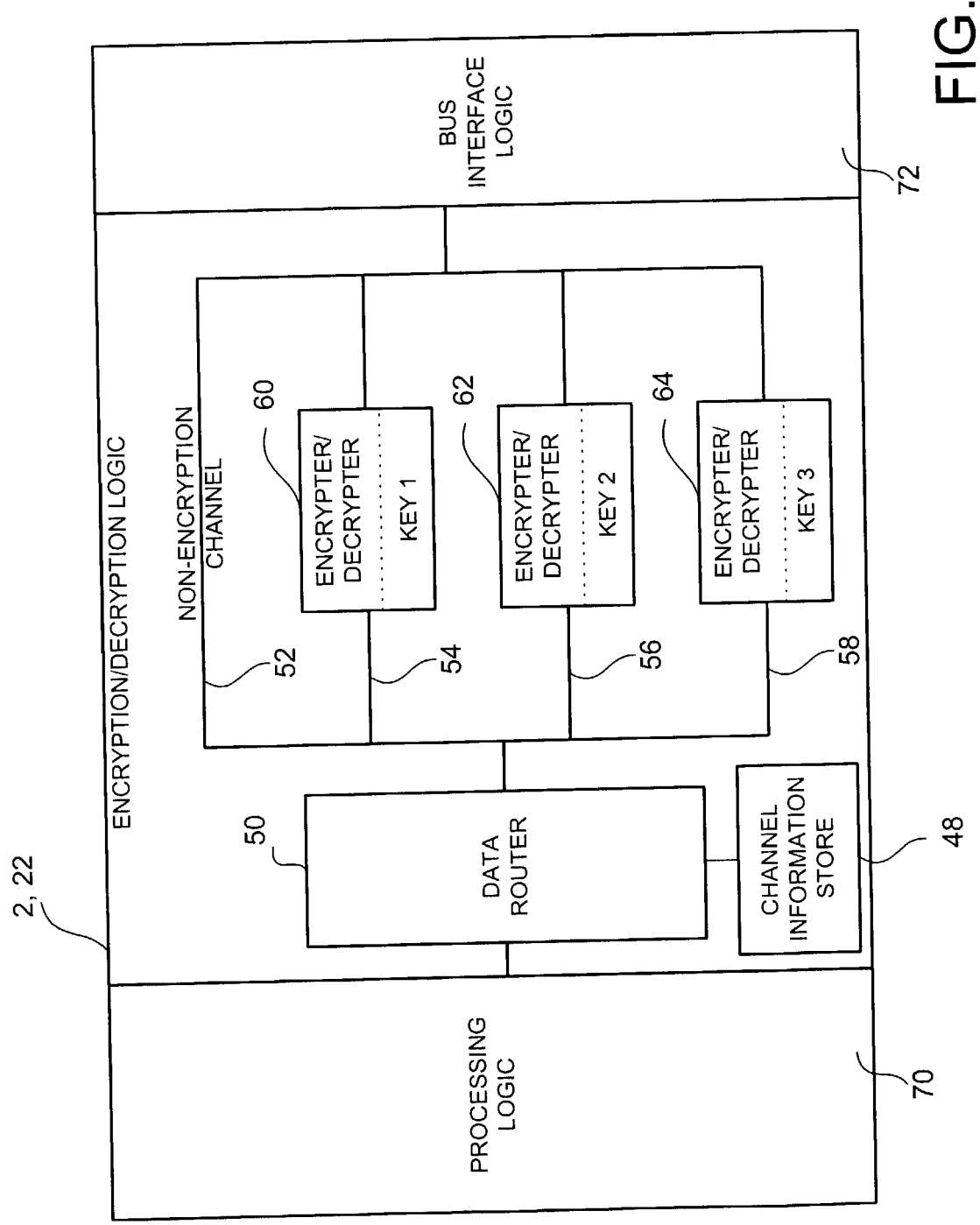
FIG. 8 shows the functional components of the computer CPU and the memory management unit for the input/output device of FIG. 1 in a second embodiment.

More particularly, referring to FIG. 8, hardware elements defining channel information store 48, data router 50, data channels 52–58 and data encrypter/decrypters 60, 62 and 64 are provided as part of the computer CPU 2 and MMU 22 in addition to the conventional processing logic 70 and the conventional bus interface logic 72.

The processing operations performed by an application 12 to write data to, or read data from, memory 4 in the second embodiment are the same as those in the first embodiment described above. The processing operations performed by the MMU driver 14 when the instructions therein are executed by the computer to obtain memory allocation for the I/O device 16 in the second embodiment are also the same as those in the first embodiment described above.

However, in the second embodiment, the translation table generated and maintained by the operating system 10 for the CPU 2, and the translation table generated and maintained by MMU driver 14 for the MMU 22 are different from the translation tables in the first embodiment.

FIG. 9 shows an example of a translation table 80 generated and maintained by the operating system 10 for the CPU 2 in the second embodiment.

Referring to FIG. 9, the data stored in the translation table 80 is different from the data stored in the translation table 30 in the first embodiment in that each physical address PA(1) to PA(n) is a conventional 64-bit physical address and does not contain any encryption bits. Instead, the encryption bits are stored as a separate entry in the translation table for each virtual address.

More particularly, the entries 82 in the translation table 80 map the virtual addresses VA(1) to VA(n) to the physical addresses PA(1) to PA(n) and define encryption bits 00 for each virtual address in the range VA(1) to VA(n). Similarly, the entries 84 map the virtual addresses VA(n+1) to VA(2n) to the physical addresses PA(1) to PA(n) and define encryption bits 01 for each virtual address in this range. The entries 86 map the virtual addresses VA(2n+1) to VA(3n) to the physical addresses PA(1) to PA(n) and define the encryption bits to be 10 for each virtual address in this range. The entries 88 map the virtual addresses VA(3n+1) to VA(4n) to the physical addresses PA(1) to PA(n) and define the encryption bits to be 11 for each virtual address in this range.

As in the first embodiment, the virtual addresses returned by the operating system 10 in response to a memory allocation request by an application in operation S2–2 (FIG. 2) are the virtual addresses VA(1) to VA(n).

The translation table generated and maintained by the MMU driver 14 for the MMU 22 has the same format as the translation table 80 shown in FIG. 9 if the I/O device 16 is operable to select whether data is to be encrypted/decrypted and the predetermined key to be used for any encryption/decryption. Otherwise, it has a format corresponding to one of the sets of entries 82, 84, 86 or 88 depending upon whether data to/from the I/O device 16 is to undergo no encryption (the translation table having a format corresponding to the entries 82 in this case) or whether data to/from the I/O device is to undergo encryption/decryption with one predetermined key (in which case the translation table corresponds to one of the sets of entries 84, 86, 88, depending upon whether the predetermined encryption key is the first, second or third key).

Figure 10:
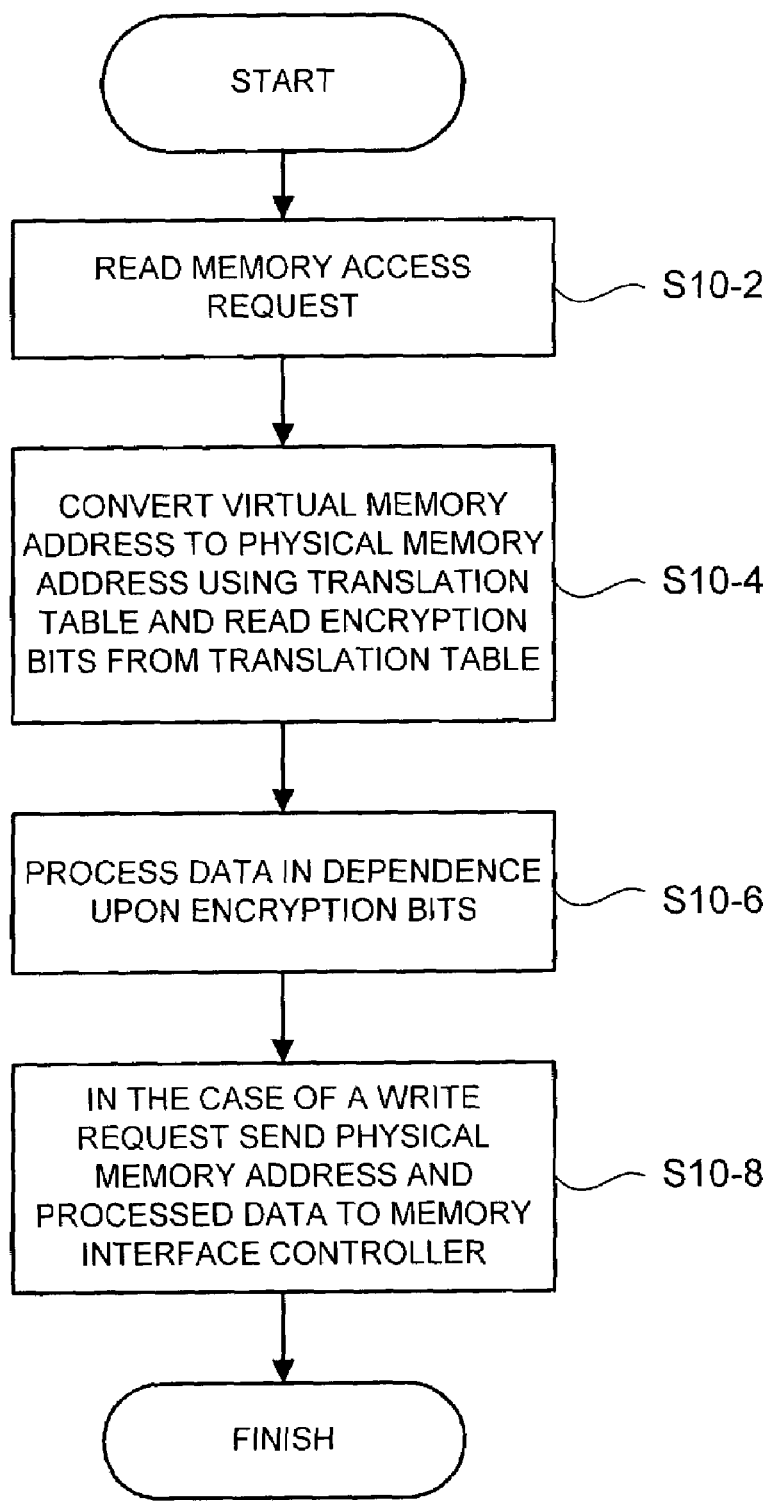
FIG. 10 shows the processing operations performed in the second embodiment by the computer CPU and the memory management unit for the input/output device of FIG. 1.

FIG. 10 shows the processing operations performed in the second embodiment by each of the computer CPU 2 and the MMU 22 in response to a memory access request from an application 12 and an I/O device 16, respectively. The CPU 2 and MMU 22 perform the processing operations shown in FIG. 10 in accordance with operating instructions defined in the computer operating system 10 and the MMU driver 14, respectively.

The processing operations shown in FIG. 10 will be described below with reference to the CPU 2. However, as noted above, corresponding operations are performed by the MMU 22 to write data to, and read data from, memory 4 independently of the CPU 2.

Referring to FIG. 10, the CPU 2 reads the memory access request received from the application 12, including the virtual address defined therein (operation S10–2).

The CPU 2 then reads the entry for the virtual memory address read in operation S10–2 in the translation table 80 maintained by the operating system 10 (operation S10–4). This entry defines the physical memory address corresponding to the virtual address and also defines the values of the two encryption bits.

The CPU 2 processes the data to be written to, or the data read from, memory 4 in accordance with the values of the two encryption bits read in operation S10–4 (operation S10–6).

More particularly, in the case of a write request, data router 50 passes the data to be written to memory 4 along one of the channels 52, 54, 56, 58 in dependence upon the values of the encryption bits in the same way as in the first embodiment. Similarly, in the case of a read request, the CPU 2 reads the data from memory 4 along one of the channels 52, 54, 56, 58 in accordance with the values of the encryption bits in the same way as in the first embodiment. Accordingly, the data is encrypted/decrypted (or passed unchanged) as defined by the values of the encryption bits in the translation table 80.

In the case of a write request, the CPU 2 sends (operation S10–8) the physical memory address (which, as explained above, is in a conventional 64-bit format without any encryption/decryption bits) and the processed data (that is, the data after processing in operation S10–6) to the memory interface controller 8 to be stored in memory 4 in a conventional manner.

Third Embodiment

A third embodiment of the invention will now be described.

The components of the third embodiment are the same as those of the second embodiment described above. That is, in the third embodiment, the processing elements 48–64 for routing data to and from memory 4 and for performing data encryption/decryption are provided as part of the computer CPU 2 and also as part of the I/O device MMU 22. The memory interface controller 8 is of a conventional format.

In the second embodiment described above, an application 12 sends a virtual memory address to the CPU 2. In response, the CPU 2 reads information from the encryption table 80 maintained by the operating system 10 defining a physical memory address and also some encryption bits. In accordance with the values of the encryption bits, the CPU 2 routes data to/from memory 4 along one of the data channels 52–58, so that the data is encrypted/decrypted in accordance with the encryption bits. Similarly, an I/O device 16 sends a virtual address to the MMU 22, and, in response, the MMU 22 reads information from an encryption table similar to encryption table 80 defining a physical memory address and some encryption bits. The MMU 22 then routes data along one of the channels 52–58 in accordance with the values of the encryption bits, so that the data is encrypted/decrypted as required by the I/O device 16.

As will now be described, in the third embodiment, the translation table generated and maintained by the operating system 10 and the translation table generated and maintained by the MMU driver 14 are different from the translation tables in the second embodiment. In particular, in the third embodiment, each translation table does not define encryption bits. Instead, the first two bits of each virtual memory address sent by application 12 to the CPU 2 are set as encryption bits, and the first two bits of each virtual memory address sent by the I/O device 16 to the MMU 22 are set as encryption bits.

FIG. 11 shows an example of a translation table 100 for virtual memory address to physical memory address conversion generated and maintained by the operating system 10 in the third embodiment.

Referring to FIG. 11, the data stored in the translation table 100 maps "n" physical memory addresses PA(1) to PA(n) into four sets of virtual memory addresses. Within each set of virtual memory addresses, the same "n" virtual memory addresses VA(1) to VA(n) are defined, but the first two bits of each virtual memory address are used as encryption bits.

More particularly, the entries 102 in the translation table 100 map the virtual memory addresses VA(1) to VA(n), each having the values 00 at the start as encryption bits, to the physical memory addresses PA(1) to PA(n). The entries 104 map the virtual memory addresses VA(1) to VA(n), each having the values 01 at the start as encryption bits, to the physical memory address PA(1) to PA(n). The entries 106 map the virtual addresses VA(1) to VA(n), each having the values 10 at the start as encryption bits, to the physical memory addresses PA(1) to PA(n). Similarly, the entries 108 map the virtual addresses VA(1) to VA(n), each having the values 11 at the start as encryption bits, to the physical memory addresses PA(1) to PA(n).

The translation table generated and maintained by the MMU driver 14 for the MMU 22 has the same format as the translation table 100 shown in FIG. 11 if the I/O device 16 is operable to select whether data is to be encrypted/decrypted and the predetermined key to be used for any encryption/decryption. Otherwise, it has a format corresponding to one of the sets of entries 102, 104, 106 or 108 depending upon whether data to/from the I/O device 16 is to undergo no encryption (the translation table having a format corresponding to the entries 102 in this case) or whether data to/from the I/O device is to undergo encryption/decryption with one predetermined key (in which case the translation table corresponds to one of the sets of entries 104, 106 or 108, depending upon whether the predetermined encryption key is the first, second or third key).

The processing operations performed by an application 12 to write data to, or read data from, memory 4 in the third embodiment are the same as those in the first embodiment described above with reference to FIG. 2. However, referring to FIG. 2, in response to a request from an application 12 in operation S2–2 for a range of virtual memory addresses, the operating system 10 returns the addresses 00VA(1) to 00VA(n) to the application 12. Then, in response to a request from the application 12 in operation S2–14 for a virtual memory address for encryption/decryption, the operating system 10 refers to the translation table 100 and returns the requested address to the application 12, with the first two bits of the virtual address comprising encryption bits set to values 01, 10 or 11 as described above. Thus, by way of example, referring to FIG. 11, if the application 12 returns the virtual address 00VA(3) to the operating system in operation S2–14 and requests a corresponding virtual memory address for encryption/decryption with key 2, then the operating system returns the virtual address 10VA(3) to the application.

Consequently, the virtual memory address sent to the CPU 2 by the application 12 in operation S2–10 or operation S2–16 includes two encryption bits as the first two bits thereof.

The processing operations performed in the third embodiment by the MMU driver 14 when the instructions therein are executed by the computer to obtain memory allocation for the I/O device 16 are also the same as those described in the first embodiment with reference to FIG. 4. However, as noted above, the translation table generated by the MMU driver 14 in operation S4–4 has a different format to the table generated in the first embodiment, and the virtual addresses passed to the I/O device 16 in operation S4–6 have the first two bits thereof set as encryption bits.

Figure 12:
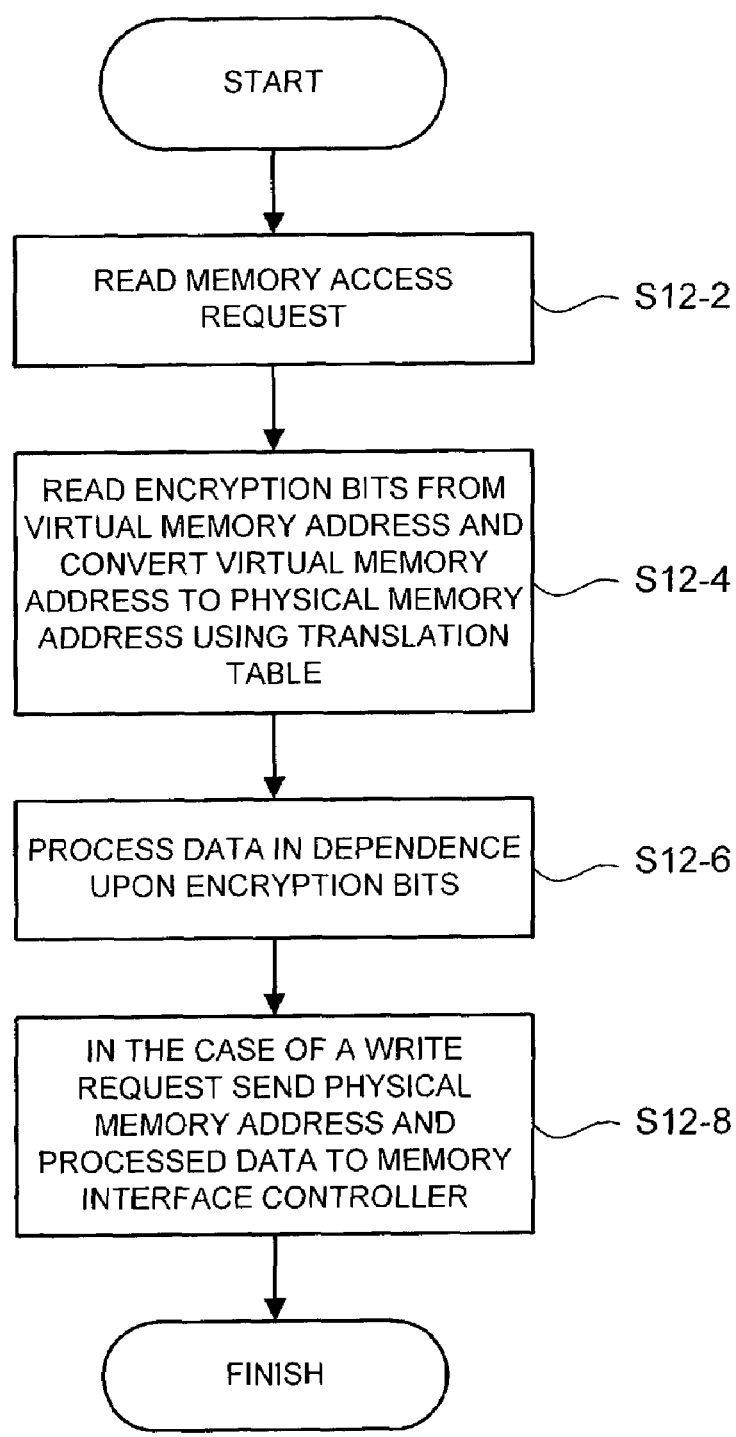
FIG. 12 shows the processing operations performed in the third embodiment by the computer CPU and the memory management unit for the input/output device of FIG. 1.

FIG. 12 shows the processing operations performed in the third embodiment by each of the computer CPU 2 and the MMU 22 in response to a memory access request from an application 12 and an I/O device 16, respectively. The CPU 2 and MMU 22 perform the processing operations shown in FIG. 12 in accordance with operating instructions defined in the computer operating system 10 and the MMU driver 14, respectively.

The processing operations shown in FIG. 12 will be described below with reference to the CPU 2. However, as noted above, corresponding operations are performed by the MMU 22 to write data to, and read data from, memory 4 independently of the CPU 2.

Referring to FIG. 12, the CPU 2 reads the memory access request received from the application 12, including the virtual memory address having the two encryption bits at the start thereof (operation S12–2).

The CPU 2 then reads the two encryption bits from the start of the virtual memory address (operation S12–4). The CPU 2 also converts the virtual memory address to a physical memory address by reading the appropriate entry in the translation table 100 maintained by the operating system 10.

The CPU 2 then writes data to, or reads data from, the memory 4 along one of the data channels 52–58 in dependence upon the values of the two encryption bits set in the virtual memory address (operation S12–6). Operations S12–6 and S12–8 in FIG. 12 are the same as operations S10–6 and S10–8 in the second embodiment. Accordingly, these operations will not be described again here.

Fourth Embodiment

A fourth embodiment of the invention will now be described.

In the fourth embodiment, the processing elements 48–64 for routing data to and from memory 4 and for performing data encryption/decryption are provided as part of the memory interface controller 8, as in the first embodiment described above.

However, in the first embodiment described above, the bridge 20 includes a memory management unit (MMU) 22 for the I/O device 16. The I/O device 16 is arranged to send virtual memory addresses to the MMU 22, and the MMU 22 converts the virtual memory addresses received from the I/O device 16 to the physical memory addresses having encryption bits which are then sent to the memory interface controller 8. Similarly, an application 12 sends virtual memory addresses to the CPU 2, and the CPU 2 converts the virtual memory addresses to physical memory addresses having encryption bits which are then sent to the memory interface controller 8.

Instead, in the fourth embodiment, the bridge 20 is provided without an MMU 22, and the I/O device driver 13 is arranged so that it sends physical memory addresses containing encryption bits to the I/O device for storage therein for memory access. More particularly, the I/O device driver 13 sends physical memory addresses to the I/O device 16 which are the addresses which correspond to the virtual memory addresses passed in the first embodiment. To access the memory 4, the I/O device 16 is arranged to send the physical memory addresses containing the encryption bits to the memory interface controller 8.

In addition, in the fourth embodiment, the application 12 and operating system 10 are written so that the application 12 requests, and receives from the operating system 10, physical memory addresses for performing encryption/decryption with a predetermined key (that is, physical memory addresses containing encryption bits). More particularly, in the fourth embodiment, the physical memory addresses allocated to the application 12 are the addresses which correspond to the virtual memory addresses allocated in the first embodiment. To access the memory 4, the application 12 sends the physical memory address containing the encryption bits to the memory interface controller 8 uncharged by the CPU 2.

Modifications and Variations

Many modifications and variations are possible to the embodiments described above within the scope of the claims.

For example, in the embodiments described above, a 64-bit word is used to specify each physical memory address. However, each physical memory address may be specified by a word of a different length.

In the embodiments described above, two bits are used to define whether data should be passed along the non-encryption channel 52 or one of the three encryption/decryption channels 54, 56, 58. However, more or fewer bits may be used. For example, one bit may be used to specify whether data is to be transferred along a non-encryption channel or a single encryption/decryption channel. Similarly, more than two bits may be used to specify more than three encryption/decryption channels.

In the embodiments described above, each key to be used for encryption/decryption is predefined in an encrypter/decrypter 60, 62, 64 of the memory interface controller 8, CPU 2 and/or MMU 22. However, instead, the key to be used for encryption/decryption may be contained in spare bits of the physical memory address or virtual memory address. For example, in the first and fourth embodiments, one spare bit of the physical memory address may be used to specify whether data is to be passed along a non-encryption channel or along a channel having a programmable encrypter/decrypter, and multiple spare bits of the physical memory address may be set to values comprising the values of the encryption key to be used by the encrypter/decrypter when encryption/decryption is to be performed. An encrypter/decrypter may then be arranged to perform encryption/decryption in accordance with the values of the bits defining the key read from the physical memory address. In this way, the key for encryption/decryption can be "programmed" into the encrypter/decrypter using the physical memory address. Similarly, in the second embodiment, a single encryption bit may be used in the translation tables generated and maintained by the operating system 10 and the MMU driver 14 to define whether data is to be passed along a non-encryption channel or along a channel having a programmable encrypter/decrypter. An application 12 and an I/O device 16 may then be arranged to set multiple spare bits of a virtual memory address to define an encryption key, and the programmable encrypter/decrypter in the CPU 2 and MMU 22 may be arranged to perform encryption/decryption in accordance with the values of the bits defining the key read from the virtual memory address. Likewise, in the third embodiment, one spare bit of each virtual memory address may be used to specify whether data is to be passed along a non-encryption channel or along a channel having a programmable encrypter/decrypter. An application 12 and an I/O device 16 may then be arranged to set multiple spare bits of a virtual memory address to define an encryption key, and the programmable encrypter/decrypter in the CPU 2 and MMU 22 may be arranged to perform encryption/decryption in accordance with the values of the bits defining the key read from the virtual memory address.

In the first, second and third embodiments described above, the code defining application 12 is such that the application 12 requests, and receives from the operating system 10, a range of non-encryption/decryption virtual memory addresses (that is, addresses which define that data is not to be encrypted/decrypted). When the application requires data to be encrypted/decrypted, one or more of the non-encryption/decryption virtual memory addresses is returned to the operating system, and the operating system returns the corresponding encryption/decryption virtual memory address(es) (operations S2–12 to S2–16 in FIG. 2). However, instead, the application may be written so that, when data is to be stored to memory, the application determines whether the data is to be encrypted/decrypted and the predetermined encryption key to be used, and requests the operating system for a range of virtual addresses defining that data should be encrypted/decrypted with the required key. In this way, the need for an application to return one or more non-encryption/decryption virtual memory addresses to the operating system is avoided. For example, if an application requested a range of virtual memory addresses for encryption/decryption to be performed using the first predefined encryption key, in the first embodiment, the operating system 10 would allocate the virtual addresses VA(n+1) to VA(2n) defined by entries 34 in the translation table 30 of FIG. 3, in the second embodiment, the operating system 10 would allocate the virtual addresses VA(n+1) to VA(2n) defined by entries 84 in the translation table 80 of FIG. 9, and in the third embodiment, the operating system 10 would allocate the virtual addresses 01VA(1) to 01VA(n) defined by entries 104 in the translation table 100 of FIG. 11.

In the first, second and third embodiments described above, the application 12 could be written to pass data to the operating system 10 defining the encryption key to be used for data encryption/decryption, and to request the operating system 10 to allocate a range of virtual memory addresses defining that data encryption/decryption should be performed using the specified key. In response, the operating system would then program a programmable encrypter/decrypter in the memory interface controller 8 or the CPU 2 with the key received from the application, set up the required translation table, and return a suitable range of virtual memory addresses to the application. Similarly, in the fourth embodiment, the application 12 could be written to pass data to the operating system 10 defining the encryption key to be used, and to request the operating system 10 to allocate a range of physical memory addresses defining that data encryption/decryption should be performed using the specified key.

In the embodiments described above, an application 12 requests memory addresses from the operating system 10 for performing encryption/decryption with a predetermined key (see, for example, processing operation S2–14 in FIG. 2). In this way, the application determines the key to be used for encryption/decryption. However, instead, the operating system 19 may be arranged to select the encryption/decryption key (and allocate memory addresses accordingly) for each application 12, and each application 12 running on the computer may be unaware that data encryption/decryption is being performed. For example, the operating system 10 may be arranged to allocate a different encryption/decryption key to each application 12, and therefore allocate different address ranges to each application. In this way, a first application is prevented from using the data of a second application even if the first application is able to access the second application's data because the first application will not be able to read the data.

In the first embodiment described above, the encryption bits defining whether or not and how data is to be encrypted/decrypted by the memory interface controller 8 are incorporated into the physical memory address sent from the CPU 2 to the memory interface controller 8. However, instead, the operating system 10 may be arranged to generate and maintain a translation table having the same form as the translation table 80 in the second embodiment, that is a translation table in which each physical address PA(1) to PA(n) is of a conventional 64-bit format and the encryption bits are specified as a separate entry in the translation table. In response to a virtual memory address, the CPU 2 may be controlled by the operating system 10 to read the corresponding entry in the translation table 80 and to send the physical memory address of conventional format defined therein to the memory interface controller 8, together with a data header containing the encryption bits defined in the translation table 80 for the virtual memory address. The data router 50 of the memory interface controller 8 would then be arranged to read the header and to pass the data along one of channels 52–58 in dependence upon the values of the encryption bits in the header. In this way, although the encryption bits are sent so that they are associated with the physical memory address, they are not actually a part of the physical memory address itself. The operating system 10 may control the CPU 2 to send encryption bits in a data packet to the memory interface controller 8 defining how data for all subsequent physical memory addresses is to be routed until new encryption bits are sent. The data router 50 may then be arranged to route all data written to, or read from, memory 4 along one of the data channels 52–58 in accordance with the encryption bits received from the CPU 2, and continue to route data along the selected channel until the channel is changed by new encryption bits received from the CPU 2.

Encryption bits may also be sent in data headers, or separate data packets, in the third embodiment. For example, an application 12 and an I/O device 16 may be arranged to send each virtual address to the CPU 2 and MMU 22 with a header containing the encryption bits. The CPU 2 and MMU 22 may then be controlled by the operating system 10 and the MMU driver 14, respectively, to read the encryption bits in the header and to pass the data along one of channels 52–58 in dependence upon the values of the encryption bits in the header. In this case, the translation table generated and maintained by the operating system 10 and MMU driver 14 is of a conventional format, defining a one-to-one mapping between "n" virtual memory addresses VA(1) to VA(n) and "n" physical memory addresses PA(1) to PA(n). An application 12 may be arranged to send encryption bits to the CPU 2 defining how data for all subsequent virtual memory addresses is to be routed until new encryption bits are sent. The data router 50 may the be arranged to route all data written to, or read from, memory 4 along one of the data channels 52–58 in accordance with the encryption bits received from the application 12 and continue to route data along the selected channel until the channel is changed by new encryption bits received from the application 12.

Similarly, in the fourth embodiment, the encryption bits may be sent by an application 12 and I/O device 16 so that they are associated with, but separate from, the physical memory address.

In the embodiments described above, each of the encrypter/decrypters 60, 62, 64 is operable to perform both encryption and decryption of data. However, separate data channels may be used for encryption and decryption respectively, each such channel having either a data encrypter or a data decrypter.

The invention claimed is:

1. A computer apparatus, including:
   a plurality of data channels for writing data to, and reading data from, memory;
   for at least one of the data channels, a data encrypter operable to encrypt data on the data channel;
   for at least one of the data channels, a data decrypter operable to decrypt data on the data channel;
   an encryption and decryption instruction generator operable to generate at least one instruction bit defining encryption or decryption instructions for data to be written to or read from the memory; and
   a data route controller operable to control the passage of data to and from the memory such that data is passed along a data channel in dependence upon the at least one instruction bit; and
   an address generator operable to generate data defining memory addresses for storage locations in the memory, wherein the address holds at least one instruction bit, which identifies which of multiple possible forms of encryption/decryption should be used on the data.

2. An apparatus according to claim 1, further including:
   an address selector operable to select a memory address; and wherein:
   the instruction generator is arranged to generate the at least one instruction bit so that it is associated with at least one memory address; and
   the data route controller is arranged to control the passage of data to and from the memory such that data is passed along a data channel in dependence upon the at least one instruction bit associated with the memory address to or from which the data is to be written or read.

3. An apparatus according to claim 2, wherein:
   the address generator and the instruction generator are arranged to generate virtual memory addresses for storage locations in the memory, each of at least some of the virtual memory addresses having associated therewith at least one instruction bit defining encryption or decryption instructions for data to be written to or read from the storage location defined by the virtual memory address; and
   the data route controller is arranged to control the passage of data to and from a storage location in the memory in dependence upon the at least one instruction bit associated with the virtual memory address for the storage location.

4. An apparatus according to claim 2, wherein:
   the address generator and the instruction generator are arranged to generate physical memory addresses for storage locations in the memory, each of at least some of the physical memory addresses having associated therewith at least one instruction bit defining encryption or decryption instructions for data to be written to or read from the storage location defined by the physical memory address; and the data route controller is arranged to control the passage of data to and from a storage location in the memory in dependence upon the at least one instruction bit associated with the physical memory address for the storage location.

5. An apparatus according to claim 2, wherein the instruction
generator is arranged to generate the at least one instruction bit so that it is part of a memory address.

6. An apparatus according to claim 2, wherein:
the address generator and the instruction generator are arranged to generate a plurality of respective memory addresses for each of at least some of the memory storage locations, each respective address for a storage location having associated therewith at least one instruction bit such that the value of the instruction bit(s) is different for each of the respective addresses for the same storage location; and
the address selector is arranged to select a memory address from the plurality of memory addresses generated by the address generator for a given memory location in dependence upon the data encryption or decryption to be performed.

7. An apparatus according to claim 6, wherein:
the address generator and the instruction generator are arranged to generate a virtual memory address to physical memory address conversion table in which each physical memory address defines a storage location in the memory and, for each of at least some of the memory storage locations, (i) the physical memory address is mapped to a plurality of different virtual memory addresses, and (ii) the translation table defines at least one instruction bit defining encryption or decryption instructions for data to be written to or read from the storage location, the instruction bit(s) having a different value for each virtual memory address defining the same storage location;
the address selector is arranged to select a virtual memory address
available for a storage location in dependence upon the data encryption or decryption to be performed;
the apparatus further comprises an address convertor operable to convert the virtual memory address selected by the address selector to a physical memory address in accordance with the translation table generated by the address generator and the instruction generator, and operable to generate encryption or decryption instruction data conveying the instruction bit(s) defined by the translation table for the virtual memory address selected by the address selector; and
the data route controller is arranged to control the passage of data to and from the memory in dependence upon the encryption or decryption instruction data generated by the address convertor.

8. An apparatus according to claim 6, wherein:
the address generator and the instruction generator are arranged to generate a virtual memory address to physical memory address conversion table in which each physical memory address defines a storage location in the memory and, for each of at least some of the memory storage locations, (i) the physical memory address is mapped to a plurality of different virtual memory addresses, and (ii) the translation table defines at least one instruction bit defining encryption or decryption instructions for data to be written to or read from the storage location, the instruction bit(s) having a different value for each virtual memory address defining the same storage location;
the address selector is arranged to select a virtual memory address available for a storage location in dependence upon the data encryption or decryption to be performed;
the apparatus further comprises an address convertor operable to convert the virtual memory address selected by the address selector to a physical memory address in accordance with the translation table generated by the address generator and the instruction generator; and
the data route controller is arranged to control the passage of data to and from the memory in dependence upon the instruction bit(s) data defined in the translation table for the virtual memory address selected by the address selector.

9. An apparatus according to claim 6, wherein the address generator and the instruction generator are arranged to generate each respective address for a storage location so that the at least one instruction bit is part of the address.

10. An apparatus according to claim 9, wherein:
the address generator and the instruction generator are arranged to generate a virtual memory address to physical memory address conversion table in which each physical memory address defines a storage location in the memory and, for each of at least some of the memory storage locations, a plurality of physical memory addresses are defined in the translation table, each of the plurality of physical memory addresses for a given storage location (i) being mapped to a different virtual memory address, and (ii) containing at least one instruction bit defining encryption or decryption instructions for data to be written to or read from the storage location, the instruction bit(s) having a different value for each physical memory address defining the same storage location;
the address selector is arranged to select a virtual memory address available for a storage location in dependence upon the data encryption or decryption to be performed;
the apparatus further comprises an address convertor operable to convert the virtual memory address selected by the address selector to a physical memory address in accordance with the translation table generated by the address generator and the instruction generator; and
the data route controller is arranged to control the passage of data to and from the memory in dependence upon the instruction bit(s) in the physical memory address generated by the address convertor.

11. An apparatus according to claim 9, wherein:
the address generator and the instruction generator are arranged to generate a virtual memory address to physical memory address conversion table in which each physical memory address defines a storage location in the memory and, for each of at least some of the memory storage locations, a plurality of virtual memory addresses are defined in the translation table, each respective virtual memory address for a given storage location containing at least one instruction bit defining encryption or decryption instructions for data to be written to or read from the storage location, the instruction bit(s) having a different value for each respective virtual memory address corresponding to the same storage location;

the address selector is arranged to select a virtual memory address available for a storage location in dependence upon the data encryption or decryption to be performed;

the apparatus further comprises an address convertor operable to convert the virtual memory address selected by the address selector to a physical memory address in accordance with the translation table generated by the address generator and the instruction generator; and the data route controller is arranged to control the passage of data to and from the memory in dependence upon the instruction bit(s) in the virtual memory address selected by the address selector.

12. An apparatus according to claim 2, further comprising a key generator operable to generate an encryption or decryption key associated with at least one memory address, and wherein the data encrypter and data decrypter are arranged to perform encryption and decryption in accordance with a key generated by the key generator for data written to or read from the associated memory address(es).

13. An apparatus according to claim 1, wherein the data encrypter and the data decrypter comprise a single device operable to encrypt and decrypt data on the same data channel.

14. A computer apparatus including a processor and a memory interface controller, wherein:

in use, the processor is controlled in response to a memory access request to convert a virtual memory address to a physical memory address and at least one associated instruction bit to define whether or not data is to be encrypted or decrypted; and the memory interface controller includes:

a plurality of data channels for writing data to, and reading data from, memory;

for at least one of the data channels, a data encrypter operable to encrypt data on the data channel;

for at least one of the data channels, a data decrypter operable to decrypt data on the data channel;

at least one data channel having no data encrypter or data decrypter therefor;

a data router operable to route the data along a data channel in dependence upon the instruction bit(s) associated with the physical memory address for the data; and an address generator operable to generate data defining memory addresses for storage locations in the memory, wherein the address holds at least one instruction bit, which identifies which of multiple possible forms of encryption/decryption should be used on the data.

15. An apparatus according to claim 14, wherein, in use, the processor is controlled to convert a virtual memory address to a physical memory address containing the instruction bit(s) as part thereof.

16. An apparatus according to claim 14, wherein:

the apparatus is operable to set a plurality of bits of the physical memory address to values comprising the values of an encryption key or decryption key; and the data encrypter and the data decrypter are arranged to perform encryption and decryption in accordance with the key values from the physical memory address.

17. An apparatus according to claim 14, wherein the data encrypter and the data decrypter comprise a single device operable to encrypt and decrypt data on the same data channel.

18. A computer apparatus having a processor, wherein:

in use, the processor is controlled in response to a memory access request to convert a virtual memory address to a physical memory address and to read at least one instruction bit defining whether or not data encryption or decryption is to be performed; and the processor includes:

a plurality of data channels for writing data to, and reading data from, memory;

for at least one of the data channels, a data encrypter operable to encrypt data on the data channel;

for at least one of the data channels, a data decrypter operable to decrypt data on the data channel;

at least one data channel having no data encrypter or data decrypter therefore;

a data router operable to route the data along a data channel in dependence upon the instruction bit(s); and an address generator operable to generate data defining memory addresses for storage locations in the memory, wherein the address holds at least one instruction bit, which identifies which of multiple possible forms of encryption/decryption should be used on the data.

19. An apparatus according to claim 18, wherein, in use, the processor is controlled to read the instruction bit(s) from data prestored in memory.

20. An apparatus according to claim 18, wherein, in use, the processor is controlled to read the instruction bit(s) from the virtual memory address.

21. An apparatus according to claim 18, wherein the data encrypter and the data decrypter comprise a single device operable to encrypt and decrypt data on the same data channel.

22. An apparatus according to claim 14 or 18, wherein the processor comprises the central processing unit for the computer.

23. An apparatus according to claim 14 or 18, wherein the processor comprises a memory management unit for an input/output device.

24. An encryption and decryption and data routing circuit for use in a computer apparatus to route data to and from memory, the circuit comprising:

a plurality of data channels for writing and reading data;

for at least one of the data channels, a data encrypter operable to encrypt data on the data channel;

for at least one of the data channels, a data decrypter operable to decrypt data on the data channel;

a data router operable to route data along a data channel; and a receiver operable to receive data defining a memory address comprising a plurality of bits and having at least one encryption/decryption instruction bit associated therewith;

wherein the data router is operable to route data along a channel in dependence upon the instruction bit(s); and an address generator operable to generate data defining memory addresses for storage locations in the memory, wherein the address holds at least one instruction bit, which identifies which of multiple possible forms of encryption/decryption should be used on the data.

25. An encryption and decryption circuit according to claim 24, further comprising:

a memory arranged to store data defining a key for use by at least one of the data encrypter and the data decrypter; and a key changer operable to change data stored in the memory.

26. An encryption and decryption circuit according to claim 24, wherein the instruction bit(s) associated with a memory address are part of the memory address, and wherein the data router is operable to read the instruction bit(s) from at least one predetermined location in the memory address bits, and to route the data in dependence upon the value(s) of the read instructions bit(s).

27. An encryption and decryption circuit according to claim 26, wherein at least one of the data encrypter and the data decrypter is operable to perform processing in accordance with a key comprising bit values from a received memory address.

28. An apparatus according to claim 24, wherein the data encrypter and the data decrypter comprise a single device operable to encrypt and decrypt data on the same data channel.

29. A central processing unit for a computer apparatus, comprising an integrated circuit which includes an encryption and decryption circuit according to claim 24.

30. An input/output device memory management unit for a computer apparatus, comprising an integrated circuit which includes an encryption and decryption circuit according to claim 24.

31. A memory interface controller for a computer apparatus, comprising an integrated circuit which includes an encryption and decryption circuit according to claim 24.

32. A computer-readable storage medium carrying instructions for causing a programmable processing apparatus to become operable to
process a memory access request to define a physical memory address for the memory access and at least one bit associated with the physical memory address defining instructions for a data encrypter or a data decrypter in dependence upon the memory access request; and to
generate a virtual memory address to physical memory address conversion table in which each physical memory address defines a storage location in memory and, for each of at least some of the memory storage locations, (i) the physical memory address is mapped to a plurality of different virtual memory addresses, and (ii) the translation table defines at least one instruction bit defining encryption or decryption instructions for data to be written to or read from the storage location, the instruction bit(s) having a different value for each virtual memory address defining the same storage location.

33. A computer-readable storage medium according to claim 32, wherein the instructions comprise instructions for causing the programmable processing apparatus to become operable to:
convert a virtual memory address defined in the memory access request to a physical memory address in accordance with the translation table together with encryption or decryption instruction data conveying the instruction bit(s) defined in the translation table for the virtual memory address in the memory access request.

34. A computer-readable storage medium according to claim 32, wherein the instructions comprise instructions for causing the programmable processing apparatus to become operable to set at least one bit of the physical memory address to specify the encryption or
decryption instructions for the data encrypter or data decrypter.

35. A computer-readable storage medium according to claim 34, wherein the instructions comprise instructions for causing the programmable processing apparatus to become operable to:
generate a virtual memory address to physical memory address conversion table in which each physical memory address defines a storage location in memory and, for each of at least some of the memory storage locations, a plurality of physical memory addresses are defined in the translation table, each respective physical memory addresses for a given storage location (i) being mapped to a different virtual memory address, and (ii) containing at least one instruction bit defining encryption or decryption instructions for data to be written to or read from the storage location, the instruction bit(s) having a different value for each physical memory address defining the same storage location; and
convert a virtual memory address defined in the memory access request to a physical memory address in accordance with the translation table.

36. A computer-readable storage medium according to claim 32, wherein the instructions further include instructions for causing the programmable processing apparatus to become operable to set a plurality of bits of the physical memory address to values comprising the values of an encryption or decryption key.

37. A computer-readable storage medium according to claim 32, wherein the instructions comprise instructions for causing a programmable processing apparatus to become operable to:
generate a virtual memory address to physical memory address conversion table in which each physical memory address defines a storage location in memory and, for each of at least some of the memory storage locations, (i) the physical memory address is mapped to a plurality of different virtual memory addresses, and (ii) the translation table defines at least one instruction bit defining encryption or decryption instructions for data to be written to or read from the storage location, the instruction bit(s) having a different value for each virtual memory address defining the same storage location;
convert a virtual memory address defined in the memory access request to a physical memory address in accordance with the translation table; and
read the instruction bit(s) stored in the translation table for the virtual memory address defined in the memory access request, thereby to define the at least one bit specifying the instructions for the data encrypter or the data decrypter.

38. A computer-readable storage medium according to claim 32, wherein the instructions comprise instructions for causing a programmable processing apparatus to become operable to:
generate a virtual memory address to physical memory address conversion table;
convert a virtual memory address defined in the memory access request to a physical memory address in accordance with the translation table; and
read data in the memory access request associated with the virtual
memory address to define the at last one bit specifying the instructions for the data encrypter or the data decrypter.

39. A computer-readable storage medium according to claim 32, wherein the instructions comprise instructions for causing a programmable processing apparatus to become operable to:
generate a virtual memory address to physical memory address conversion table;
convert a virtual memory address defined in the memory access request to a physical memory address in accordance with the translation table; and
read at least one bit of the virtual memory address to define the at least one bit specifying the instructions for the data encrypter or the data decrypter.

40. A computer-readable storage medium according to claim 32, wherein the instructions define an operating system for a computer apparatus.

41. A computer-readable storage medium carrying instructions for causing a programmable processing apparatus to become operable to allocate a plurality of physical memory addresses for memory access, wherein at least one instruction bit for each of at least some of the addresses define encryption or decryption instructions for a data encrypter or a data decrypter.

42. A computer-readable storage medium according to claim 41, wherein the instructions comprise instructions for causing the programmable processing apparatus to become operable to set the instruction bit(s) as part of the physical memory address.

43. A computer-readable storage medium according to claim 32 or 41, wherein the instructions define a driver for a programmable memory management unit for an input/output device.

44. A computer-readable storage medium carrying instructions defining an application to be run on a programmable processing apparatus, the instructions including instructions, wherein the instructions define at least one instruction bit defining encryption or decryption instructions for data to be written to or read from the storage location, the instruction bit(s) having a different value for each virtual memory address defining the same storage location, which, when executed on the programmable processing apparatus, cause a virtual memory address to be generated as part of a memory access request in dependence upon how data to be written to, or read from, the memory storage location defined by the virtual memory address is to be encrypted or decrypted.

45. A computer-readable storage medium according to claim 44, wherein the instructions include instructions which, when executed on the programmable processing apparatus, cause a request to be sent to the operating system of the apparatus for a virtual memory address having a value defining that data to be written to, or read from, the memory storage location defined by the virtual memory address is to be encrypted or decrypted.

46. A computer-readable storage medium according to claim 45, wherein the instructions include instructions which, when executed on the programmable processing apparatus, cause the request to be sent to the operating system to include at least one virtual memory address previously allocated by the operating system.

47. A computer-readable storage medium according to claim 44, wherein the instructions include instructions which, when executed on the programmable processing apparatus, cause the request sent to the operating system of the apparatus to include a key for encryption or decryption.

48. A computer-readable storage medium carrying instructions defining an application to be run on a programmable processing apparatus, the instructions including instructions, wherein the instructions define at least one instruction bit defining encryption or decryption instructions for data to be written to or read from the storage location, the instruction bit(s) having a different value for each virtual memory address defining the same storage location which, when executed on the programmable processing apparatus, cause a memory access request to be generated which includes a memory address and associated instruction data defining whether or not data to be written to, or read from, the memory storage location defined by the memory address is to be encrypted or decrypted.

49. A computer-readable storage medium according to claim 48, wherein the instructions comprise instructions which, when executed on the programmable processing apparatus, cause the memory access request to be generated which includes a memory address which contains the instruction data as part thereof.

50. A computer-readable storage medium according to claim 48, wherein the instructions comprise instructions which, when executed on the programmable processing apparatus, cause the memory address generated as part of a memory access request to be a virtual memory address.

51. A computer-readable storage medium according to claim 48, wherein the instructions comprise instructions which, when executed on the programmable processing apparatus, cause the memory address generated as part of a memory access request to be a physical memory address.

52. An input/output device for a computer apparatus, comprising:
 a memory arranged to store data defining a plurality of respective memory addresses for each of a plurality of storage locations; and
 an address selector operable to select a memory address for memory access in dependence upon how data to be written to, or read from, the memory storage location defined by the memory address, wherein the memory address includes at least one instruction bit defining encryption or decryption instructions by which the data is to be encrypted or decrypted.

53. An input/output device for a computer apparatus, comprising:
 a memory arranged to store data defining a plurality of respective memory addresses;
 a memory selector operable to select a memory address;
 an instruction generator operable to generate instruction data conveying instructions about how data to be written to, or read from, the memory storage location defined by the memory address is to be encrypted or decrypted;
 a memory access request generator operable to generate a memory access request including the selected memory request and the instruction data; and
 an address generator operable to generate data defining memory addresses for storage locations in the memory, wherein the address holds at least one instruction bit, which identifies which of multiple possible forms of encryption/decryption should be used on the data.

54. A method of encrypting and decrypting data in a computer apparatus, comprising:
 associating instruction data with a memory address defining encryption or decryption instructions for data to be written to or read from the memory address, wherein the memory address includes at least one instruction bit defining encryption or decryption instructions by which the data is encrypted or decrypted; and
 writing data to, or reading data from, the memory location defined by the memory address via a data channel selected from a plurality of data channels in dependence upon the associated instruction data, each data channel having different encryption or decryption characteristics from the other data channels.

* * * * *